United States Patent
Ammirati

(10) Patent No.: US 10,155,480 B2
(45) Date of Patent: Dec. 18, 2018

(54) VEHICLE RACK FOR BOTH SHORT AND LONG LADDERS

(71) Applicant: Philip Ammirati, Pearl River, NY (US)

(72) Inventor: Philip Ammirati, Pearl River, NY (US)

(*) Notice: Subject to any disclaimer, the term of this patent is extended or adjusted under 35 U.S.C. 154(b) by 0 days.

(21) Appl. No.: 15/054,556

(22) Filed: Feb. 26, 2016

(65) Prior Publication Data

US 2016/0250976 A1 Sep. 1, 2016

Related U.S. Application Data

(60) Provisional application No. 62/126,037, filed on Feb. 27, 2015.

(51) Int. Cl.
*B60R 3/00* (2006.01)
*B60R 9/048* (2006.01)
*B60R 9/042* (2006.01)

(52) U.S. Cl.
CPC .......... *B60R 9/0485* (2013.01); *B60R 9/0423* (2013.01)

(58) Field of Classification Search
CPC .. B60R 3/00; B60R 9/00; B60R 9/045; B60R 11/06
USPC ........ 224/502, 505, 509, 513, 519, 521, 310
See application file for complete search history.

(56) References Cited

U.S. PATENT DOCUMENTS

| | | | | |
|---|---|---|---|---|
| 3,804,207 A * | 4/1974 | Stonebraker | ............ | B66F 11/04 182/103 |
| 3,888,398 A * | 6/1975 | Payne | ................... | B60R 9/0423 224/310 |
| 3,913,811 A * | 10/1975 | Spencer | .................... | B60R 9/06 224/497 |
| 4,954,030 A * | 9/1990 | Szucs | ...................... | B60R 9/048 224/318 |
| 5,009,350 A * | 4/1991 | Schill | .................... | B60R 9/0485 182/127 |
| 5,058,791 A * | 10/1991 | Henriquez | ............ | B60R 9/0423 224/310 |
| 5,190,195 A * | 3/1993 | Fullhart | .................... | B60R 9/10 224/497 |
| 5,330,084 A * | 7/1994 | Peters | ....................... | B60R 9/06 211/171 |
| 5,443,189 A * | 8/1995 | Hirschfeld | ................ | B60R 9/06 224/282 |
| 5,451,088 A * | 9/1995 | Broad | ....................... | B60R 9/06 224/405 |
| 5,458,389 A * | 10/1995 | Young | ....................... | B60R 9/06 224/402 |
| 5,649,656 A * | 7/1997 | Davy | .................... | B60P 3/1025 224/405 |
| 5,850,891 A * | 12/1998 | Olms | .................... | B60R 9/0423 182/127 |
| 6,092,972 A * | 7/2000 | Levi | ..................... | B60R 9/0423 224/310 |
| 6,315,181 B1 * | 11/2001 | Bradley | ................ | B60R 9/0423 224/310 |
| D466,394 S * | 12/2002 | Neider | .......................... | D8/354 |
| 7,419,076 B1 * | 9/2008 | Grothues | .................. | B60R 9/08 114/343 |

(Continued)

*Primary Examiner* — Brian D Nash

(57) ABSTRACT

Provided herein is a novel vehicle mounted ladder rack which advantageously combines the ability to carry a short ladder vertically and/or to support one end of a long ladder horizontally. The novel ladder rack of the invention allows workers to select the appropriate ladder length for a particular job and transport it using only a single rack.

3 Claims, 3 Drawing Sheets

(56) References Cited

U.S. PATENT DOCUMENTS

| | | | | |
|---|---|---|---|---|
| 7,651,147 B2* | 1/2010 | Eidsmore | ............... | B60P 1/24 |
| | | | | 224/402 |
| 7,766,202 B2* | 8/2010 | Depot | ............... | B60R 9/06 |
| | | | | 224/504 |
| 7,861,903 B2* | 1/2011 | Plaschka | ............... | B60R 9/06 |
| | | | | 224/402 |
| 8,066,162 B2* | 11/2011 | Chiang | ............... | B60R 9/06 |
| | | | | 224/321 |
| 8,070,028 B2* | 12/2011 | Segeren | ............... | B62D 33/08 |
| | | | | 224/402 |
| 8,104,577 B1* | 1/2012 | Reed | ............... | E06C 5/02 |
| | | | | 182/127 |
| 8,166,695 B2* | 5/2012 | Pippin | ............... | F41A 23/06 |
| | | | | 224/519 |
| 8,591,164 B2* | 11/2013 | Prosser | ............... | B60P 1/5476 |
| | | | | 414/539 |
| 2002/0090285 A1* | 7/2002 | Levi | ............... | E06C 5/00 |
| | | | | 414/462 |
| 2003/0094827 A1* | 5/2003 | Faludy | ............... | B60P 3/36 |
| | | | | 296/26.06 |
| 2003/0175101 A1* | 9/2003 | Levi | ............... | B60R 9/0423 |
| | | | | 414/462 |
| 2006/0185933 A1* | 8/2006 | Thibault | ............... | B60R 9/0423 |
| | | | | 182/127 |
| 2007/0158379 A1 | 7/2007 | Bell | | |
| 2008/0179363 A1* | 7/2008 | Schmidlkofer | ............... | B60R 3/00 |
| | | | | 224/400 |
| 2012/0263561 A1* | 10/2012 | Li | ............... | B60R 9/0423 |
| | | | | 414/462 |
| 2014/0030054 A1* | 1/2014 | Levi | ............... | B60R 9/0423 |
| | | | | 414/809 |

* cited by examiner

VEHICLE RACK FOR BOTH SHORT AND LONG LADDERS

CROSS-REFERENCE TO RELATED APPLICATIONS

This application claims the benefit of U.S. Provisional Application No. 62/126,037, filed Feb. 27, 2015, the contents of which are hereby incorporated by reference, in their entirety.

STATEMENT REGARDING FEDERALLY FUNDED RESEARCH OR DEVELOPMENT

Not Applicable.

INTRODUCTION AND SUMMARY OF THE INVENTION

Ladders are an essential tool for painters, roofers, electricians, construction workers, and others and typically must be carried to worksites by vehicle. Depending on the particulars of the job, a person may require a short ladder, for example, when the job site is a building interior. A short ladder may be any ladder in the range of four to ten feet long, for example being a folding ladder, step ladder, straight ladder or miniature extension ladder. In other instances, the user may require a longer ladder, for example, for reaching high areas on a building exterior. A long ladder may be any ladder in the range of 10 to 20 feet long, for example being a folding ladder, step ladder, straight ladder, or extension ladder. Exemplary extension ladders are 24 foot ladders, 32 foot ladders, or a 40 foot ladders (dimensions are those of the extension ladders when extended).

Various ladder racks for automobiles are known in the art. Typical ladder racks comprise supports that allow a ladder to be secured in a horizontal orientation, for example above the bed of a pickup truck or along the roof of a van. For short ladders, e.g. step ladders (for example being in the range of four to ten feet in length when retracted or collapsed), an especially useful mounting system is one that holds the ladder vertically. A vertical ladder rack allows easy loading and unloading of, and access to, the ladder. An exemplary vertical ladder rack for short ladders is described in United States Patent Application Publication Number US20070158379, entitled "Hitch Mounted Ladder Rack," by Bell. Such designs are especially useful for short ladders, however, they are not practical for the use of longer ladders, which cannot be safely mounted in a vertical position due to the hazards of bridges, overpasses, and electrical wires.

Accordingly, there is a need in the art for systems that advantageously combine the convenience of a vertical rack for short ladders with the long-ladder carrying ability of a horizontal rack. Disclosed herein is a novel ladder carrying system which enables a user to conveniently carry both short and long ladders on a truck or any other type of vehicle.

BRIEF DESCRIPTION OF THE DRAWINGS

FIG. 3A depicts an exemplary folding ladder rack of the invention having a short ladder mounted thereon, with the rack in the upright position. FIG. 3B depicts the exemplary folding ladder rack of the invention having a short ladder mounted thereon, with the rack folded down.

DETAILED DESCRIPTION OF THE INVENTION

Figure 1:
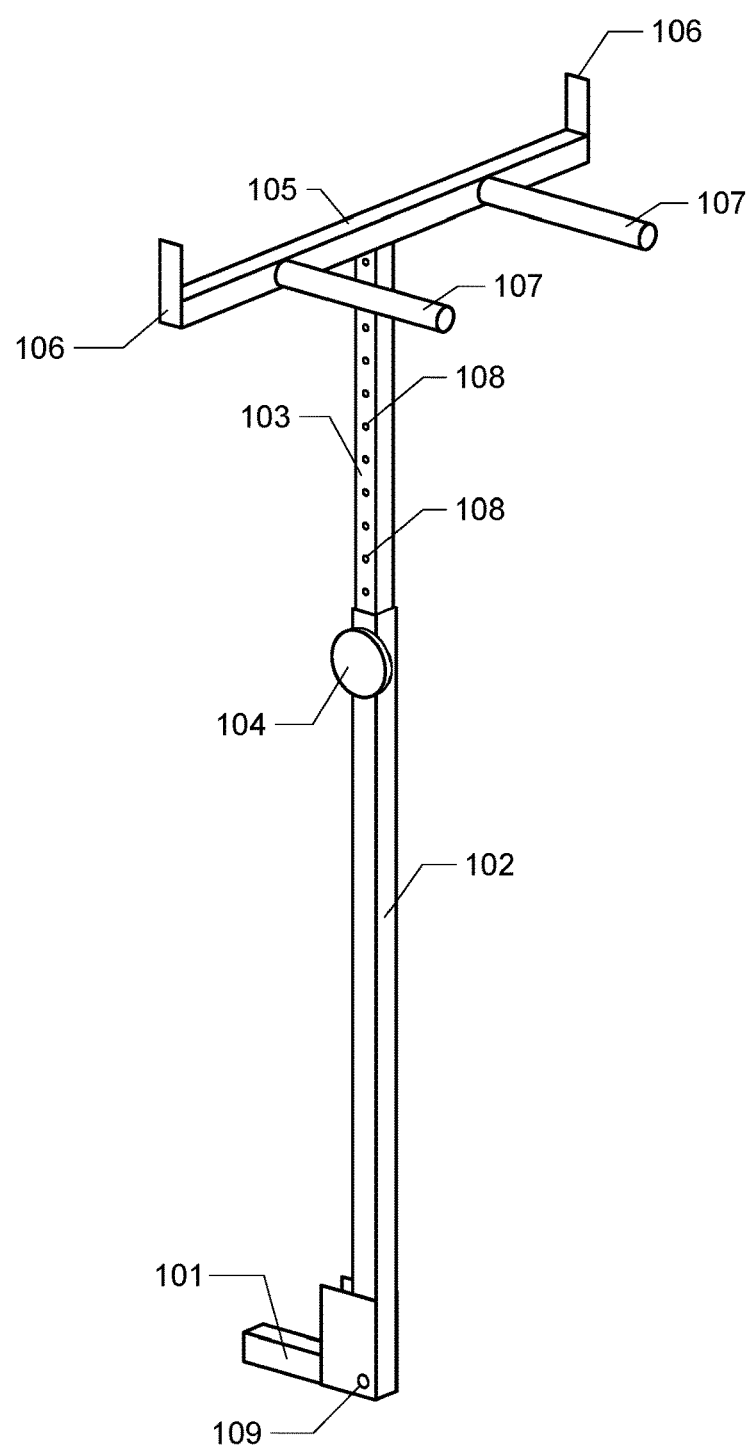
FIG. 1 depicts an exemplary embodiment of the invention wherein the upright comprises two telescoping pieces.

In various aspects, the invention comprises novel vehicle ladder racks, vehicle ladder rack systems comprising multiple separate components, and methods of carrying ladders on vehicles. The racks of the invention comprise multiple elements, including: (1) a vehicle mount; (2) a vertical upright; (3) one or more ladder attachment mechanisms; and (4) a horizontal ladder support.

In one embodiment, the invention encompasses a method of using the ladder rack of the invention to carry a short ladder vertically, or a to support one end of a long ladder horizontally. In one embodiment, the invention comprises a method of using the rack of the invention to simultaneously carry a vertically oriented short ladder and support one end of a horizontally oriented long ladder.

The disclosure will make reference to "front" as well as "rear," or "backwards" orientations. It will be understood that such terms refer to the front-to-back orientation of an automobile. For convenience, the disclosure will refer to the vertical and horizontal elements of the invention as being capable of mounting "a ladder." However, it will be understood that multiple ladders may be stacked upon one another and that the racks of the invention are capable of carrying two or more vertically attached ladders or two or more horizontally attached ladders.

Next, each element of the invention will be described in detail.

Vehicle Mount.

The vehicle mount comprises any structure, mechanism, or combination of parts which allows the rack to be mounted to a vehicle. The vehicle mount may be permanently or non-permanently attached to the vehicle.

A preferred vehicle mount is a horizontal shank that couples with a receiver trailer hitch, the shank also known as a male connector. The vehicle mount of the invention may be limited to the shank, or may comprise an assembly which includes a receiver hitch female connector. The invention encompasses the use of custom-sized receivers and complementary shanks. Alternatively, the receiver hitch and shank may comprise standard shank sizes such as 1.25 inch, 2 inch, or 2.5 inch square-shaped components. The shank may have at least one pair of opposing holes along its length in order to accommodate a bolt (for example with a nut fixed on or within the shank) cotter pin, pull pin, or other rod which pins the shank and receiver hitch together securely. Any other means of connecting the shank to the hitch may be used. Multiple pairs of opposing holes at different positions along the shank may be employed to allow the user to adjust the distance which the vertical ladder rack protrudes rearward from the receiver hitch. Generally, the upright of the ladder rack will be mounted close to the rearmost vertical surface of the vehicle, for example 1-4 inches from the rearmost vertical surface or protrusion.

Any other means of connecting the vertical upright to the vehicle may be used. For example, in one embodiment, the vehicle mount comprises a strap-on carrier, which may comprise numerous configurations of straps and a solid frame or like object. The solid frame provides a support for the vertical ladder rack and typically has rubber tipped feet or edges which brace the vertical load against the body of the car (on tailgates, bumpers, trunks, windows and other parts of the vehicle). Angled frames may be used when the vehicle mount is to be utilized with a vehicle not having a substantially vertical rear end (for example a sedan). The straps are connected to the frame on one end and may terminate with flat hooks which can be fitted into the slots between car parts (e.g. between the body and a trunk or between the body of the automobile and the rear door). At least two, typically four such hooks may be used and will typically have adjustable tension straps that allow the user to tighten the ladder rack to the automobile.

Vertical Upright.

The vertical upright is any structure comprising a one or more substantially vertically oriented posts, poles, or other upright structures. The one or more vertical uprights may comprise a single vertical upright such as a post or pole. The post or pole may comprise two or more telescoping pieces, with a mechanism for securing the telescoping pieces in place, such as a stop peg and holes, a cotter pin and holes, internal or external twist action locking mechanisms, or any other means known in the art for securing two telescoping pieces. The vertical upright may be tubular, square, or any other shape.

Alternative implementations include multiple vertical uprights, for example two or more vertical uprights. Exemplary embodiments include a forked ladder rack, comprising two parallel vertical uprights which converge at the bottom at the vehicle attachment mechanism, the convergence being an angled "V" or a straight "goalpost" configuration. In those embodiments wherein the vehicle attachment mechanisms is a frame and strap configuration, the frame may double as the one or more vertical uprights.

Folding Rack.

In one implementation, the rack is folding or otherwise configured at the bottom of the vertical upright such that the vertical upright can be lowered to a horizontal position. For example, a pivot, hinge, or other folding mechanism may be present at the junction of the vertical upright and trailer shank. For example, any number of fold-down, hitch-mounted mechanisms are known in the art, for example as found on bike racks. Such folding mechanisms will comprise locking mechanisms for securing the pivoting upright in place, such as cotter pins, set screws, locking bars, and other mechanisms known in the art. The use of a folding upright allows the user to move the ladder rack out of the way and drop the tailgate (if mounted on a pickup truck) or open the back doors (if mounted on a van or other vehicle having a rear door), and conveniently allows attachment of the ladder to the vertical upright while the ladder is on the ground. In an alternative configuration, the vertical upright is mounted on a swing-away mounting system that allows it to be moved horizontally out of the way of the back doors or tailgate, as the case may be.

Ladder Attachment Mechanisms.

Ladder attachment mechanisms encompasses any device, structure, or hardware which facilitates attachment to the ladder rack of the invention. The one or more ladder attachment mechanisms may be located on the vertical upright, on the horizontal ladder support, or may be present on both elements. "Vertical ladder attachment mechanisms" will refer to ladder attachment mechanisms which aid in the attachment of a ladder to the rack in a vertical position. "Horizontal ladder attachment mechanisms" will refer to ladder attachment mechanisms which aid in the attachment of a ladder to the rack in a horizontal position. The invention is not limited to any specific design or type of ladder attachment mechanism. Exemplary vertical ladder attachment mechanisms include rear-facing rods or other projections, or hooks, on which rungs of a short ladder may be supported, for example a pair of rear-facing projections. For example, a pair of rear-facing rods or projections being eight to 16 inches long may be employed, the two rear-facing projections being spaced apart such that a ladder can rest upon them stably, for example being spaced eight to 18 inches apart, for example, about 12 inches apart. Each rear-facing rod or projection may terminate with an endplate or other vertical structure that prevents the mounted ladder from sliding off the back of the rack. The ladder attachment mechanism may alternatively comprise holes or slots, through which bungee cords or straps, respectively, can be fitted to aid in securing the ladder. In one embodiment, securing straps are integral to the ladder rack, including rubber or other flexible polymeric straps having holes that can be fitted around a flanged peg to secure a ladder in place. Exemplary flexible straps include Yakima WORLD STRAPS™ and CHAIN STRAPS™. Ratcheting straps may also be employed.

The Horizontal Ladder Support.

The horizontal ladder support is a bar, rod, hollow tube, or other body which is situated at the top of the one or more vertical uprights and which extends laterally (i.e. perpendicular to the forward-rear axis of the vehicle). This horizontal ladder support functions as a support upon which one end of a long ladder, oriented along the forward-rear axis of the vehicle, can be rested and to which the long ladder can be secured. The horizontal ladder support may comprise one or more ladder attachment mechanisms such as slots for straps, straps, holes for bungee cord hooks, ratchet straps, or any other body or device which aids in tying, strapping, or otherwise securing the long ladder to the horizontal support.

The horizontal ladder support may sit atop a vertical upright which comprises two or more telescoping pieces and a locking mechanism, such as a pull pin, such that the height of the horizontal ladder support can be adjusted to accommodate different vehicle heights.

The ends of the horizontal ladder support may optionally terminate with end plates, flanges, vertical extensions, or other structures that prevent lateral sliding of the long ladder off the ends of the horizontal ladder support.

The ladder rack of the invention may be used in combination with one or more additional horizontal supports located towards the front of the vehicle in order to secure a long ladder along or above the top of the vehicle. For example, a standard cross-bar rack mounted on the roof (or bed cap) of the vehicle may comprise a second support and attachment body located towards the front of the vehicle. Alternatively, in the case of pickup truck, a cross bar mounted across the bed of the truck may serve as the second support and attachment body. Generally, it is preferred that the second support and attachment body be at substantially the same height as the horizontal ladder support, such that a long ladder is substantially horizontal when mounted. However, the two may be at different heights, such that the ladder is carried at an angle with respect to the ground.

In one embodiment, the invention comprises a method of carrying a long ladder in a horizontal position above a vehicle wherein the ladder rack of the invention and a forward-located horizontal support body are used in combination.

Materials and Manufacture.

The various elements of the invention may be manufactured of any material suitable for the intended function. For example, the shank, vertical uprights, rearward-facing extensions, and horizontal ladder support may be manufactured of steel, aluminum, carbon fiber, or any other metal or alloys of sufficient stiffness and durability to support conventional ladders. Hollow round or square tubing may advantageously be used to increase strength-to-weight ratios. The various components of the invention may be welded, bolted, adhered, or otherwise joined together.

Exemplary Embodiment

An exemplary embodiment of the invention is the ladder rack of FIG. 1. The ladder rack of FIG. 1 comprises a vehicle mount (101), in this case a shank which is compatible with the female connector of a receiver hitch (not shown). The rack of FIG. 1 further comprises a vertical upright, comprising two telescoping sections (102 and 103), extending upwards from the trailer hitch. The telescoping upper section (103) is locked into place by a stop peg (104) which fits holes (108) on the upper piece. The rack further comprises a horizontal support member (105), the horizontal support member being capable of supporting one end of a horizontally mounted ladder, especially a long ladder such as an extension ladder. The ends of the horizontal ladder support may optionally comprise end plates (106) which prevent lateral shifting of the ladder. In the exemplary embodiment of FIG. 1, protruding rearward from the horizontal ladder support are two ladder attachment mechanisms (107), for example comprising rods, bars, or tubes. A short ladder can be attached to the upright by resting a rung of such short ladder on the protruding rods (107), and further securing it with straps or ties. Optionally, the terminal ends of the protruding rods (107) can be capped with end-plates or other bodies (not shown) that prevent a ladder from sliding off the rear of the rack. A pivot, hinge, or other folding element (109) can be used to lower the vertical upright into a horizontal position so that the tailgate or doors (304) of the vehicle can be accessed without having to remove the ladder rack from the hitch.

Figure 2:
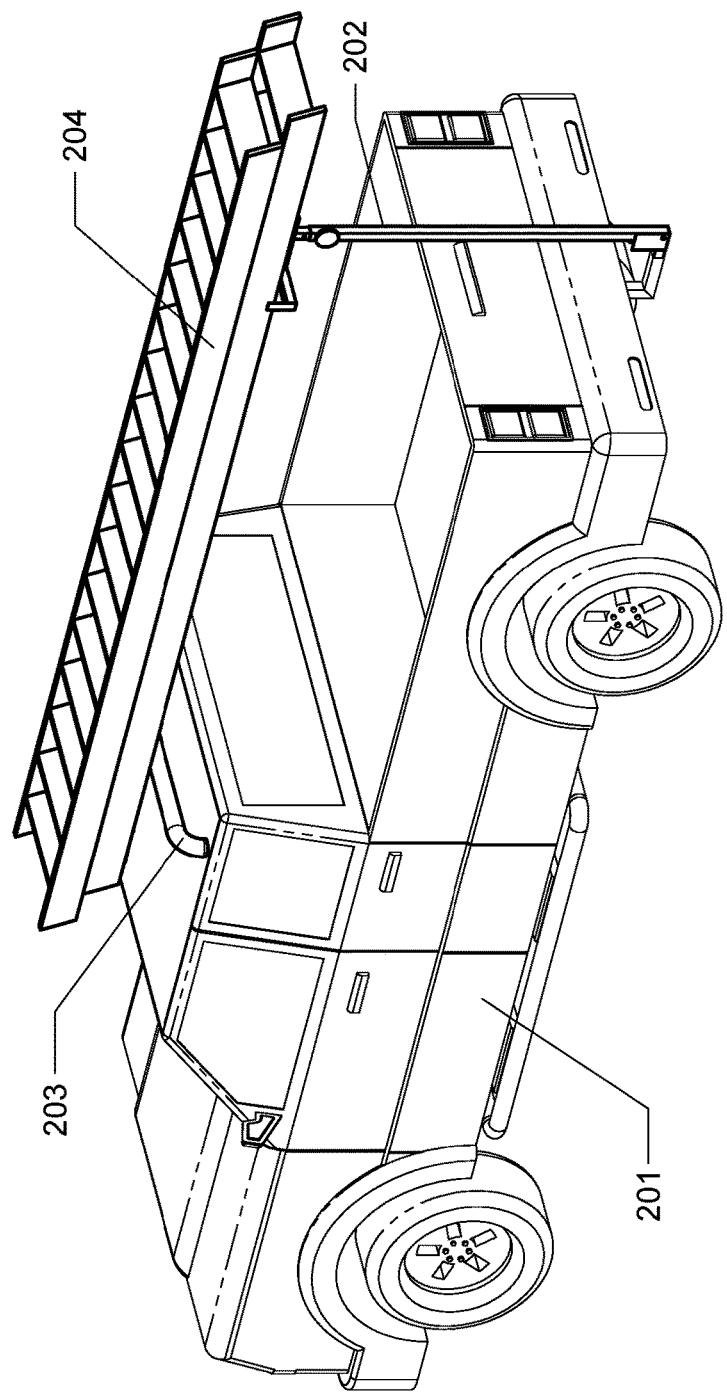
FIG. 2 depicts the ladder rack of the invention in use on a pickup truck.

FIG. 2 depicts the ladder rack in use carrying a horizontally oriented long ladder. A pickup truck (201) has the rack (202) mounted in a trailer hitch. The truck also has a forward mounted horizontal support (203) comprising a bar across the roof of the pickup truck cab. A long ladder (204) is attached and carried using the combination of rack (202) and horizontal cross bar (203).

Figure 3A:
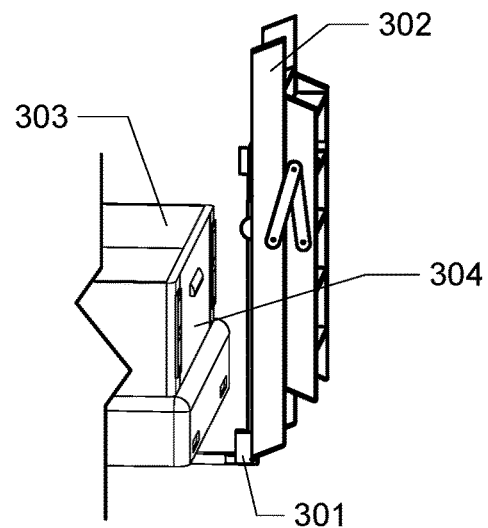
FIG. 3A and FIG. 3B.
Figure 3B:
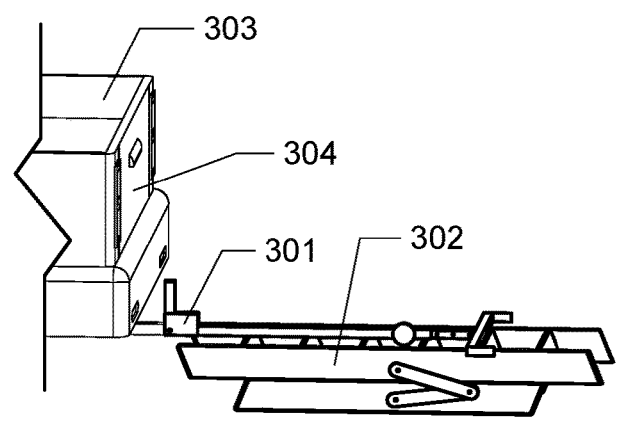

FIGS. 3A and 3B depict a folding rack used to carry a short ladder. In FIG. 3A, the rack (301) is mounted on a vehicle (303) in the upright position for carrying a short ladder (302) in a vertical orientation. In FIG. 3B, the upright section of the folding rack (301) has been lowered to a horizontal position so that the tailgate (304) can be lowered to facilitate the loading or unloading of materials.

Example 1

A ladder rack of the invention was constructed from square steel tubing, wherein the vehicle mount is the shank of a receiver hitch. The rack was mounted onto a pickup truck. The rack can accommodate two short ladders mounted in the vertical position. The ladders are hooked onto a pair of bodies protruding from the horizontal ladder support, and are further secured by strapping them around the vertical upright. The junction between the vertical upright and the vehicle mount is folding, such that the ladder can be lowered for accessing the tailgate or rear doors of the vehicle. A long ladder can be rested on the horizontal ladder support of the rack, with the opposite end of the ladder being supported by a roof-mounted cross bar.

All patents, patent applications, and publications cited in this specification are herein incorporated by reference to the same extent as if each independent patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

What is claimed is:

1. A system for carrying ladders on a vehicle, comprising a rack for carrying ladders, the rack comprising a vertical upright comprising a lower and an upper end; a shank which is compatible with a receiver hitch, wherein the shank is perpendicular to the vertical upright and is integral with the vertical upright at the lower end; a horizontal ladder support, wherein the horizontal ladder support comprises a bar, rod, or hollow tube perpendicular to the vertical upright and integral with the upper end of the vertical upright, and which bar, rod, or hollow tube is also perpendicular to the shank; and a vertical ladder attachment mechanism comprising a pair of horizontal rods projecting rearward from the horizontal ladder support; a horizontal cross bar mounted on the vehicle forward of the rack; and one or more ladders, wherein the one or more ladders is resting in the horizontal position with one end portion supported by the horizontal ladder support of the rack and the opposite end portion of the ladder supported by the horizontal cross bar of the rack, or is mounted to in a vertical orientation the vertical upright of the rack by the one or more vertical ladder attachment mechanisms of the rack.

2. The system of claim 1, wherein the rack further comprises a folding element located at the junction between the bottom end of the vertical upright and the shank, which allows the vertical upright to be lowered to a horizontal position.

3. The system of claim 1, wherein the vertical upright comprises two or more poles or posts.

* * * * *